Figure 2:
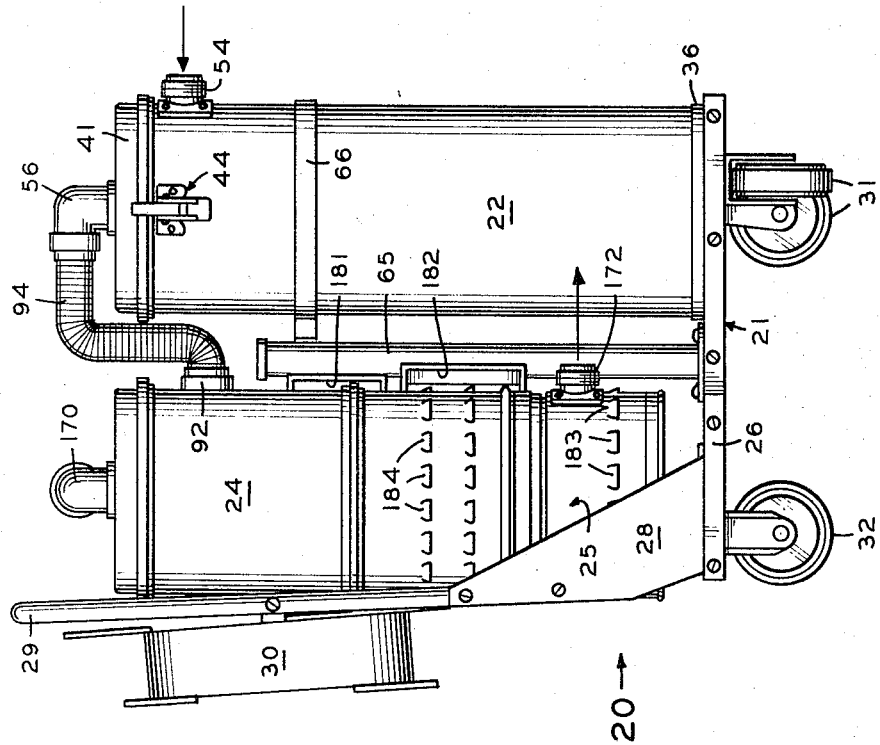

March 14, 1967 H. W. McCULLOCH ETAL 3,308,609
VACUUM CLEANING SYSTEM
Filed Nov. 27, 1963 4 Sheets-Sheet 1

INVENTORS
HAROLD W. McCULLOCH
F. E. FARLEY
BY *Kingsland, Rogers, Ezell & Robbins*

ATTORNEYS

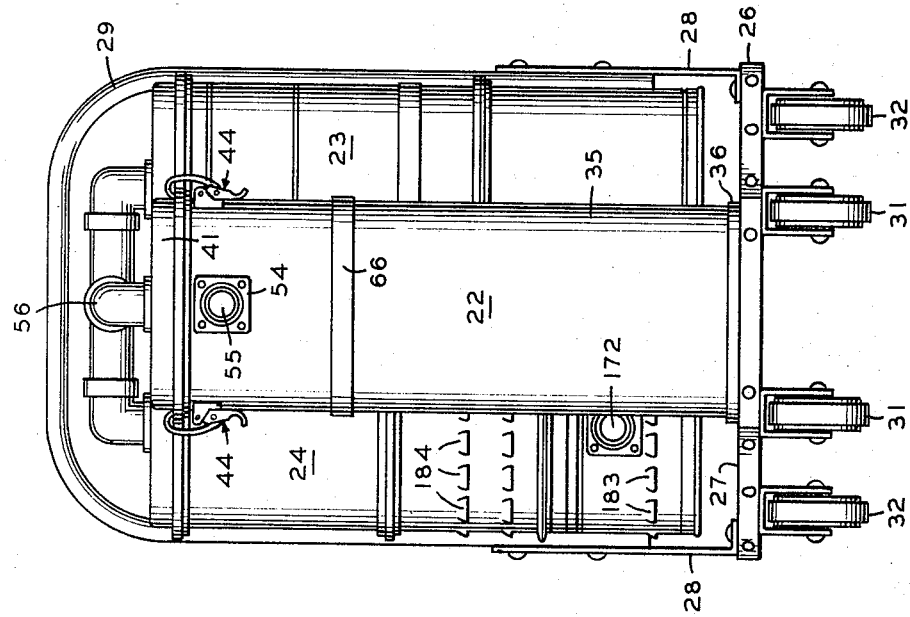
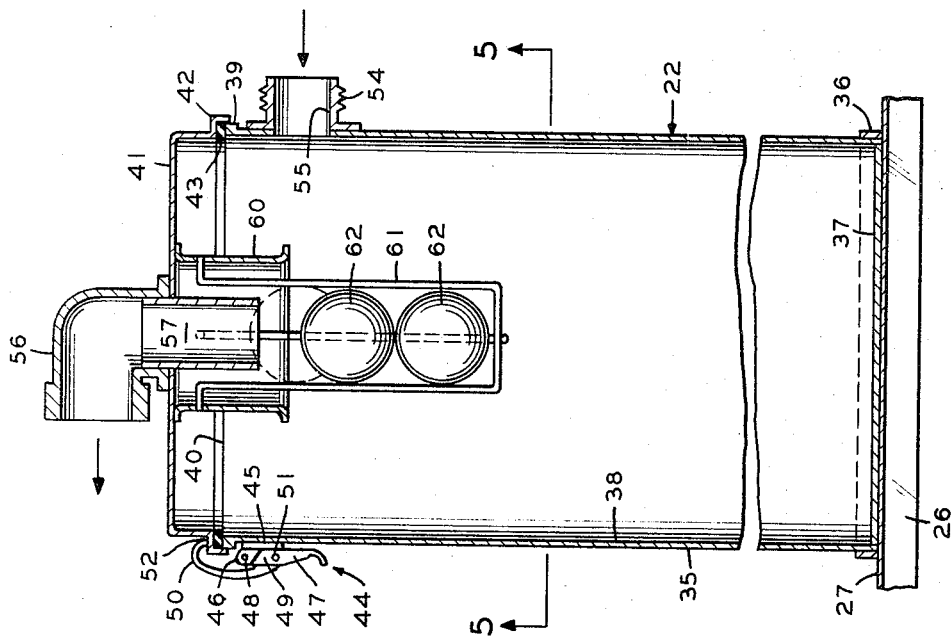

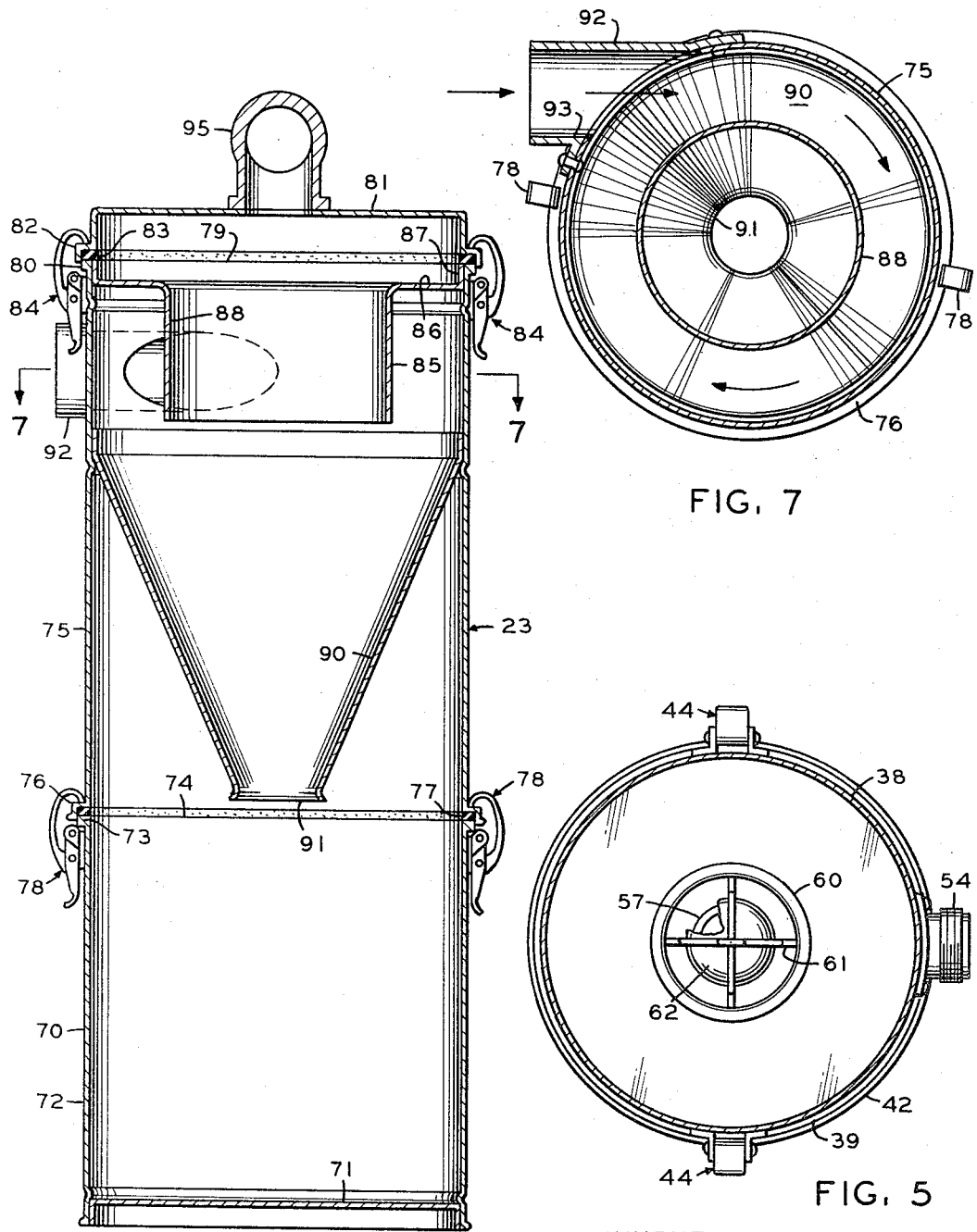

March 14, 1967 H. W. McCULLOCH ETAL 3,308,609
VACUUM CLEANING SYSTEM
Filed Nov. 27, 1963 4 Sheets-Sheet 4

INVENTORS
HAROLD W. McCULLOCH
F. E. FARLEY
BY
Kingsland, Rogers, Ezell & Robbins
ATTORNEYS 3,308,609
VACUUM CLEANING SYSTEM
Harold W. McCulloch, Mesquite, and Forney E. Farley, Dallas, Tex., assignors to John E. Mitchell Company, Dallas, Tex., a corporation of Missouri
Filed Nov. 27, 1963, Ser. No. 326,423
2 Claims. (Cl. 55—319)

This invention relates to a vacuum cleaning system that can be used to pick up all kinds of dirt, trash, liquid and other heavy or light material in small or large particles. The air that carries this trash and foreign material is conveyed through a series of separators and filters and is discharged from the cleaning system in such a clean condition that all particles above about 5 microns will have been taken out of the air.

The system comprises a series of cleaning units that are connected in series to a source of sub-atmospheric pressure. This source of sub-atmospheric pressure can be adjusted for high or low velocity and for high or low volumes of air flow, thereby making the system work best for different kinds of foreign matter.

The air is conveyed successively through a large or heavy particle and liquid separator, thence to a cyclone separator, and finally to a micron separator that filters out all the remaining fine dirt and dust above about 5 microns. The heavy particle and liquid separator is in the general form of a tank that is below atmospheric pressure. As air enters the tank, conveying heavy particles such as bobby pins, paper clips, chunks of dirt, pebbles and the like, as well as various liquids such as water and cleaning fluid, the particles and/or liquid fall into the tank and the air is sucked out through the top of the tank into the next cleaning section, which is the cyclone separator. Air that enters the cyclone separator is caused to swirl around in a cyclonic path above an inverted frusto-conical funnel-like member. As the dirt swirls around, all but the finer dust and dirt particles fall into the frusto-conical funnel and swirl downwardly into a dirt receptacle tank. The relatively clean air is sucked out of the cyclone separator into the micron separator. In the micron separator, the air is drawn through a Fiberglas or foam precleaner and then through a paper dry filter. This combination of filters eliminates virtually all of the fine dirt and dust particles so that the air, when discharged from the system, is substantially clean.

The principal object of this invention is to provide a vacuum cleaner system that is capable of picking up virtually all kinds of dirt and trash, as well as liquid, and that separates substantially all the dirt, trash and liquid from the air, discharging the air in an almost perfectly clean condition.

Another object of the invention is to provide a vacuum cleaning system as generally outlined heretofore having a series of cleaning stages each of which operates to remove such a portion of foreign matter conveyed by the air through the system that the next cleaning stage is able to operate at maximum efficiency.

Another object of the invention is to provide a vacuum cleaning system that has a plurality of cleaning stages for effectively removing various kinds of dirt, trash and liquid from air and that is portable and compact.

Another object of the invention is to provide a vacuum cleaning system as generally outlined that has removable dirt receptacles including a liquid receptacle having an automatically operable valving means for blocking the flow of air through the system when the liquid receptacle fills with liquid.

Another important object of the invention is to provide a vacuum cleaning system that will alternately produce a high velocity air flow for separating out foreign matter that is best separated when the air is moving at a high velocity, but that can be easily switched to a low velocity high volume flow to separate other materials from the air.

Other objects and advantages will be apparent to those skilled in the art.

Figure 1:
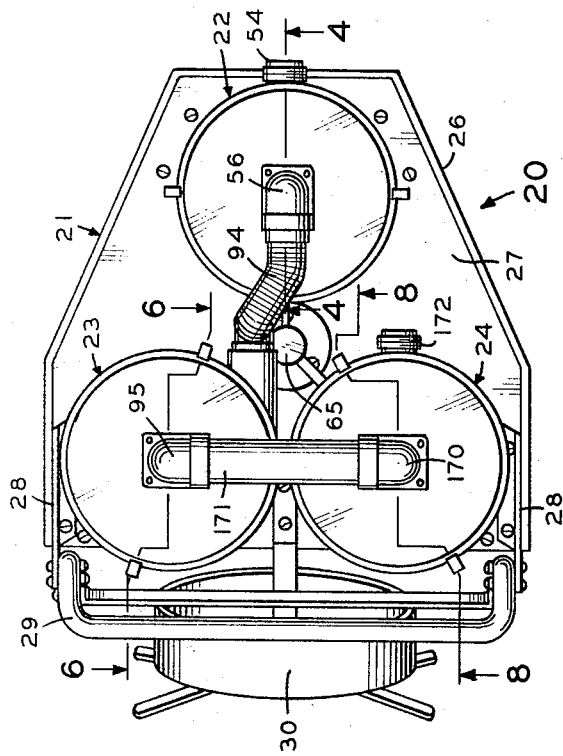
Figure 8:
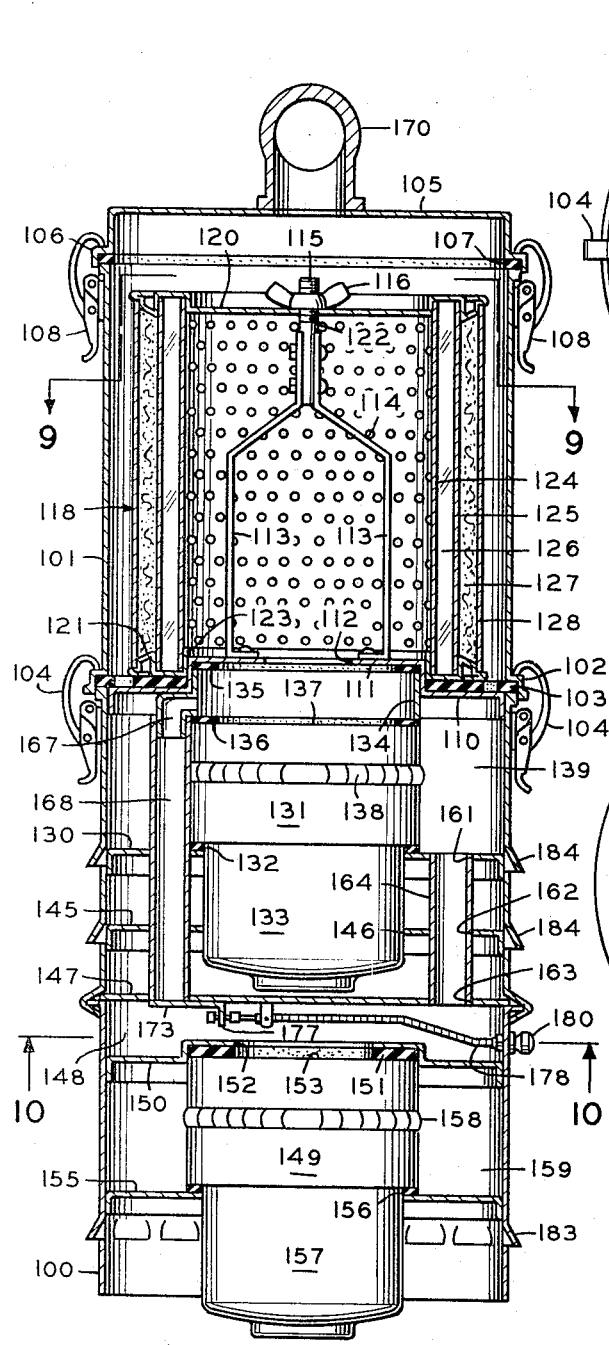
Figure 9:
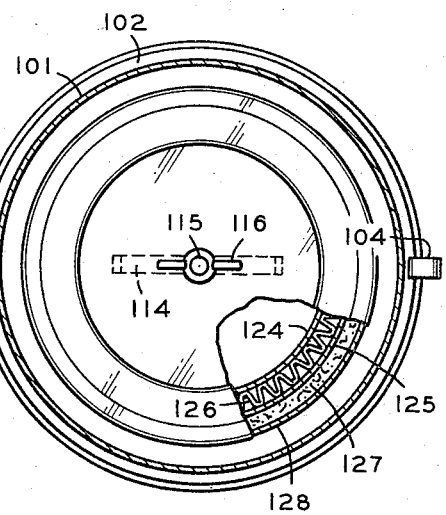
Figure 10:
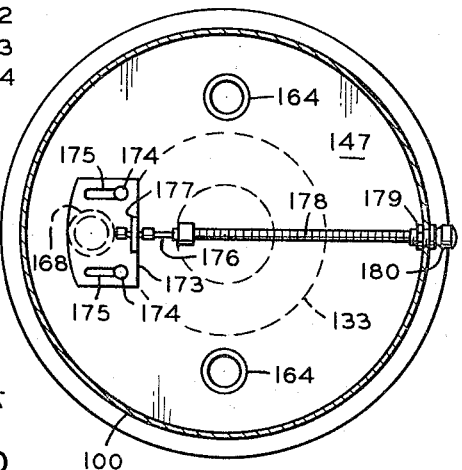

In the drawings:
FIGURE 1 is a top plan view of the vacuum cleaning system;
FIGURE 2 is a side elevation view of the vacuum cleaning system viewed from the bottom of FIGURE 1;
FIGURE 3 is a front elevation view of the vacuum cleaning system viewed from the right side of FIGURE 2;
FIGURE 4 is a view in section on an enlarged scale taken along the line 4—4 of FIGURE 1;
FIGURE 5 is a view in section taken along the line 5—5 of FIGURE 4;
FIGURE 6 is a view in section on an enlarged scale taken along the line 6—6 of FIGURE 1;
FIGURE 7 is a view in section taken along the line 7—7 of FIGURE 6;
FIGURE 8 is a view in section on an enlarged scale taken along the line 8—8 of FIGURE 1;
FIGURE 9 is a view in section taken along the line 9—9 of FIGURE 8; and
FIG. 10 is a view in section taken along the line 10—10 of FIGURE 8.

This vacuum cleaning system 20 comprises a series of components that cooperate to produce a portable, extremely effective vacuum unit. These basic components of the unit include a wheeled base 21 upon which are mounted a water and heavy particle separator 22, a cyclone separator 23, a micron particle separator 24, and a power section 25.

The base 21 comprises a metal frame 26 within which a horizontal platform 27 is mounted. A pair of vertical plates 28 are fastened to the rear of the frame 26. A vertical frame 29 is fastened between the plates 28 to provide a pushing handle as well as a mounting frame for a rotatable drum 30 about which a flexible hose can be wound.

Forward and rearward wheels 31 and 32 are mounted beneath the horizontal platform 27. The forward wheels 31 are mounted on swivels so that as the vacuum cleaning unit 20 is pushed, it can be easily turned.

The water and heavy particle separator 22 comprises a cylindrical tank 35 that stands upon the platform 27 within a circular frame 36. The tank 35 has a bottom 37 and a cylindrical side wall 38 that has a rim 39 around its upper edge 40. A top 41 having an annular outwardly and downwardly depending flange 42 fits over the top edge 40 of the tank 35. There is a vacuum sealing ring 43 between the flange 42 of the top 41 and the upper rim 40 of the tank 35.

The top 41 is held against the upper edge 40 of the tank 35 by two snap fasteners 44 each of which comprises a plate 45 mounted against the side wall 38 of the tank 35. A pair of lugs 46 extend outwardly from the plate 45 and a finger operated lever 47 is pivoted about a pin 48 that extends the lugs 46. The lever 47 has a pair of side flanges 49, and a curved spring metal strip 50 is pivotally mounted on a pin 51 that extends through the flanges 49. The upper end 52 of the strip 50 engages the top of the shoulder 42 on the lid 41.

A threaded inlet fitting 54 is fastened to the side of the tank 35 just below its upper edge 40. There is a hole 55 through the fitting 54 and through the side of the tank. The purpose of the inlet fitting 54 is to provide a connection to a hose to which various attachment tools may be connected for pushing up dirt, liquid, etc. An outlet L 56 is fastened to the center of the top 41. A tube 57 is fitted to the inner lower side of the outlet L 56 and projects downwardly into the tank 35.

A sleeve 60 is mounted to the lower side of the top 41 surrounding the tube 57. The sleeve 60 supports a wire frame 61 within which a pair of ball floats 62 are received. The diameter of each ball float 62 is greater than the diameter of the tube 57. The ball floats 62 are heavier than air but are light enough to float on water or other liquid.

There is a post 65 mounted on the horizontal platform 27. A metal strap 66 is welded to the post 65. The strap 66 is wrapped around the side of the tank 35, but it can be released when necessary to lift the tank 35 off the platform for reasons to be described.

The cyclone separator section 23 comprises a cylindrical casing 70 having a bottom wall 71 and a cylindrical side wall 72, that has a bead 73 adjacent its upper edge 74. There is a cylindrical housing 75 above the casing 70. The housing 75 has an annular outwardly and downwardly depending shoulder 76 at its lower edge that fits above the bead 73. A vacuum seal 77 is pressed between the shoulder 76 and the bead 73. A pair of snap fasteners 78, of the same construction as the previously described snap fastener 44, releasably locks the housing 75 to the casing 70.

The cylinder 75 has an upper edge 79 with a rim 80 around it. A cover 81, having an annular outwardly and downwardly depending shoulder 82, rests upon a vacuum seal 83 that is on the rim 80. A pair of snap fasteners 84, like the snap fasteners 78 and 44, hold the lid 81 in place.

A dust pan 85 is mounted adjacent the upper end of the cylinder 75. The dust pan 85 is formed with a horizontal ring 86 leading to a vertical flange 87 that is welded to the side wall of the cylinder 75. A vertical tube 88 extends downwardly from the inner side of the ring 86.

Spaced slightly below the lower edge of the tube 88 is an inverted frusto-conical member 90, called a separator cone. The lower end 91 of the separator cone 90 is flared outwardly.

An inlet fitting 92 is connected through the side of the cylinder 75 at an elevation that is opposite the vertical tube 88. There is an opening 93 through the inlet fitting 92 that is directed tangentially out of the cylinder 75, as illustrated in FIGURE 7. The inlet fitting 92 is connected by a hose 94 to the outlet L 56 leading from the liquid and heavy particle separator 22.

There is an outlet L 95 opening through the center of the cover 81. The center of the opening through the outlet L 95 is coaxial with the axis of the vertical tube 88 and the separator cone 90.

The micron separator 24 is mounted above a cylindrical casing 100 that houses the power section 25 (presently to be described). The micron separator 24 has a cylindrical housing 101 with an outwardly and downwardly directed annular flange 102 at its lower end. The flange 102 rests upon a vacuum seal 103 that is on top of the casing 100. Snap fasteners 104, identical to the previously described snap fasteners, lock the housing 101 to the casing 100. A cover 105 having a lower flange 106 is also joined with a vacuum seal 107 to the housing 101 by a pair of snap fasteners 108.

A plate 110 having a raised center 111 is mounted adjacent the upper edge of the casing 100. There is a hole 112 through the raised center 111. Two arms 113 of a filter retainer 114 are riveted to the raised center 111 of the plate 110. The arms 113 are bent together at their tops and are bolted to a stud 115 to which a thumb-screw 116 can be threaded. The filter retainer 114 is used to mount a conventional dry filter and precleaner assembly 118.

The dry filter and precleaner assembly 118 is mounted between an upper plate 120 and a lower plate 121, both of which are bent to the configurations illustrated in FIGURE 8. The upper plate has only a small hole 122 through it that receives the stud 115. The lower plate 121 has a much larger opening 123 through it. An inner cylindrical screen 124, located at the periphery of the opening 123, extends upwardly to the upper plate 120. There is another screen 125 spaced from the inner screen 124, and a conventional corrugated paper dry air filter 126 between the inner screen 124 and the intermediate screen 125. This dry air filter may be any commercially available filter, such as Fram air filter cartridge.

The precleaner is provided by a flexible Fiberglas foam sheet 127 that is wrapped about the intermediate screen 125. The foam sheet 127 is removable, but is held in place by a removable outer screen 128. Any suitable clamps can be used to hold the screen 128 in place, and such clamps are not illustrated. It will be understood that the clamps are releasable so that the screen 128 can be removed to permit removal of the precleaner 127. The precleaner is a commercial product, such as a Fram precleaner cartridge.

There is a horizontal plate wall 130 welded to the side of the motor casing 100 below its upper edge. An impeller pump 131 is mounted on the plate 130 with a gasket 132 between the pump and the plate 130 to provide a vacuum seal. A motor 133 that drives the impeller pump 131 hangs below the plate 130.

A sleeve 134 is positioned between the top of the impeller pump 131 and the plate 110. A pair of gaskets 135 and 136 above and below the sleeve 134 provide vacuum seals. The inlet to the impeller pump 131 is through the top 137 which, as shown in FIGURE 8, communicates with the hole 112 in the plate 110 via the sleeve 134.

The outlet from the impeller 110 is through a plurality of louvers 138 around the side of the impeller pump. The impeller pump 131 therefore draws air from the interior of the filter and precleaner assembly 118 and discharges it through the louvers 138 into the space 139 surrounding the impeller pump 131. This space 139, which is airtight, is defined at its upper side by the plate 110, at its lower side by the plate 130, at its outer side by the casing 100, and at its inner side by the sleeve 134 and the housing of the impeller pump 131.

There is a plate 145 below the plate 130 the principal purpose of which is to add rigidity to the housing 100 and to stabilize the position of the motor 133. As shown in FIGURE 8, the motor 133 projects through a hole 146 in the plate 145.

Below the plate 145, there is another plate 147 that defines the upper side of an inlet space 148 to another impeller pump 149. The lower side of the inlet space 148 is defined by a plate 150 that extends across the top of the impeller pump 149. There is a vacuum seal 151 between the plate 150 and the housing of the impeller pump 149. The plate 150 has a hole 152 through its center that opens the space 148 to the inlet 153 at the top of the impeller pump 149.

The impeller pump 149 is mounted on a plate 155 that is welded to the inner wall of the casing 100. There is a vacuum seal 156 between the impeller pump 149 and the plate 155. A motor 157 that drives the impeller pump 149 projects below the plate 155.

The outlet from the impeller pump 149 is provided by a series of louvers 158 through the side of the impeller pump 149. These louvers 158 discharge into an outlet space 159 that is defined by the plate 150, the plate 155, the casing 100, and the housing of the impeller pump 149.

The plate 130 has two holes 161 through it. There are also holes 162 and 163 through the plates 145 and 147 coaxial with the holes 161. A tube 164 extends through each set of coaxial holes 161, 162 and 163 to provide air passages between the outlet space 139 from the impeller pump 131 to the inlet space 148 above the impeller pump 149. The tubes 164 are welded or brazed all the way around to the plates 130 and 147 so that there can be no air leakage.

There is an elbow fitting 167 connected into the side of the sleeve 134. A tube 168 is connected to the lower end of the elbow and extends through the plates 130, 145 and 147, terminating at the lower surface of the plate 147. The mounting of the elbow fitting and the tube 168 is such to provide an airtight passage from the sleeve 134 to the space 148 on the inlet side of the impeller pump 149.

An inlet L 170 is connected through the cover 105. A hose 171 connects the inlet L 170 to the outlet L 95 from the cyclone separator 23.

An outlet fitting 172 extends through the casing 100 in communication with the outlet space 159. A hose can be connected to this outlet fitting 172 to transfer the discharged exhaust air to the exterior of a building, or the discharged air can simply be exhausted directly from the fitting 172. This exhaust air is clean.

A slide plate 173 is mounted against the lower side of the plate 147 by a pair of rivets 174. The rivets extend through elongated slots 175 in the slide plate, allowing the slide plate 173 to be horizontally reciprocated. In one position, the slide plate 173 covers the lower end of the tube 168, as illustrated in FIGURES 8 and 10. In the other position, the slide plate frees the lower end of the tube 168 to establish communication between the interior of the sleeve 134 and the inlet space 148 on the inlet side of the impeller pump 149. A wire 176 is connected to a tab 177 on the slide plate and extends through a flexible cable 178 and through a bushing 179 in the side of the casing 100. A knob 180 connected to the end of the wire 176 makes the slide plate 173 manually operable from outside the casing 100.

The micron separator 24 and power unit 25 are bolted to suitable brackets 181 and 182 that are welded to the post 65. As shown in FIGURE 2, this mounting spaces the lower end of the casing 100 from the platform 27. This lower end is open, and the motor 157 is thereby made accessible to the cooling of atmospheric air. In addition, there are louvers 183 through the side of the casing 100 to further admit cooling air to the motor 157. As shown in FIGURE 8, these louvers 183 are below the plate 155 so this atmospheric air cannot communicate with the space 159 on the discharge side of the impeller pump 149. There are also louvers 184 in the side of the casing 100 between the plates 130 and 147 to admit cooling air to the motor 133. The plates 130 and 147 prevent this cooling air from being admitted to the spaces 139 and 148.

OPERATION

In normal operation of this vacuum cleaning system, the impeller pumps 131 and 149 are connected to operate in series. This produces the highest air velocity through the system, which is best for conveying the normal foreign matter such as dirt, lint, liquid, soap suds, paper clips, bugs, etc. To cause this series operation, the knob 180 is pushed toward the motor housing 100. This moves the plate 173 across the lower opening of the air passage 168, blocking that air passage. Then the only passages available for the flow of air to the impeller pump 149 are the passages 164 which communicate with the outlet chamber 139 on the outlet side of the impeller pump 131.

Now, when the motors 133 and 157 are energized, sub-atmospheric pressures are established in the micron separator housing 101, the cyclone separator housing 75, and the heavy particle and liquid separator housing 35. An intake hose (not shown) that is connected to the inlet fitting 54 directs air, conveying dirt, trash, etc. and/or liquid, into the heavy particle and liquid separator 22. Any attachment tool may be connected to the intake hose as is understood in the art.

The high velocity air passes through the inlet 55 into the heavy particle and liquid separator 22. The sub-atmospheric pressure within the housing 35 draws this air and various kinds of heavy and light dirt and trash particles and liquid into the housing. Since the pressure at the outlet 57, which is closer to the vacuum source, is further below atmospheric, the air and trash and liquid are drawn toward the outlet 57. For liquid and heavy particles, however, the force of gravity is greater than the outlet suction, and the liquid and heavy particles drop into the lower portion of the housing 35 as the air moves fast from the inlet 55 toward the outlet 57. The lighter particles of dirt, trash and perhaps some liquid are carried with the air through the outlet 57.

The air passes from the outlet 57 through the connecting hose 94 to the inlet 93 to the cyclone separator 23. As shown in FIGURES 6 and 7, this air is drawn tangentially into the space between the outer housing wall 75 and the tube 88, spaced from the wall 75. The air swirls through this space at a high velocity for a sufficient period of time to permit most of the dirt, trash and remaining liquid to fall by gravity in a swirling path down the inner side of the cone separator 90. As the air swirls around the aforesaid space, it is drawn toward the lower edge of the tube 88 and then upwardly toward the outlet 95 by the still lower sub-atmospheric pressure existing at that outlet. The air still carries fine dirt and dust particles which are drawn with the air through the hose 171 to the micron separator inlet 170.

Since the cover plate 120 over the filter and precleaner assembly 118 is impervious to air, the air is drawn around the outer side of the assembly 118. The area on the inner side of the filter and percleaner assembly 118 is at still lower pressure, so that the air is drawn through the Fiberglas precleaner sheet 127 and through the corrugated paper 126 that provides the dry filter. This precleaner and dry cleaner action removes substantially all the fine dirt and dust particles from the air down to about 5 microns. The now clean air passes through the sleeve 134 into the entrance 137 to the impeller pump 131 and out the louvers 138 around the side of the impeller pump 131. Since the plate 173 blocks the air passage 168, the air is drawn through the air passages 164 to the inlet chamber 148 above the lower impeller pump 149. The air enters the inlet 153 to the impeller pump 149, and leaves the impeller pump 149 through the outlet louvers 158. The air passes through the outlet chamber 159 and is discharged through the outlet 172 as clean air. Since this air is clean it may be used for any purpose that requires air at a pressure above atmospheric, or it may be discharged into the room, or it may be conveyed by a suitable hose (not shown) to the exterior of a building.

The heavy particle and liquid separator 22 should separate all or almost all of the liquid from the air. What little liquid there is remaining in the air is separated from the air by the cyclone separator 23. As the housing 35 of the heavy particle and liquid separator fills with liquid, the plastic balls 62 float on the surface and are carried upwardly. When the upper one of the plastic balls 62 reaches the lower edge of the outlet tube 57, it blocks the outlet tube. This prevents liquid from so filling the housing 35 that it flows through the outlet. The blocking of the outlet 57 also interrupts the operation of the vacuum so it is easy to recognize that the housing is filled with liquid. The housing is easily emptied by releasing the fasteners 44 and removing the cover 41. Then the housing 35 is lifted away from the platform 27 and is emptied and cleaned, if necessary.

The high velocity air produced by the series operation of the impeller pumps 131 and 149 is best for most cleaning operations. However, for light fluffy materials, such as whipped cream, a low velocity and less restricted pickup channel is desirable. The increased pickup area reduces the pressure drop through the system but increases the volume of air flow. It is easy to change the system from series to parallel operation. The knob 180 is simply pulled away from the cabinet to slide the plate 173 away from the air passage 168. Then the impeller pumps 131 and 149 operate in parallel with some of the air going to the inlet 137 to the impeller pump 131 and the rest of the air bypassing the impeller pump 131 by way of the air passage 168 and entering the inlet 153 to the impeller pump 149. With this parallel operation, virtually all the slow moving fluffy material is drawn into the heavy particle and liquid separator 22 and falls by gravity into the lower portion of the housing 35.

Various changes and modifications may be made within the purview of this invention as will be readily apparent to those skilled in the art. Such changes and modifications are within the scope and teaching of this invention as defined by the claims appended thereto.

What is claimed is:

1. A vacuum cleaning system comprising a base, first, second, and third individual tanks supported side by side by the base, a first inlet opening into the first tank adjacent the upper end thereof for admitting air carrying dirt and liquid, the lower portion of the first tank below the inlet thereof providing a heavy particle and liquid receptacle for receiving heavy dirt particles and at least most of the liquid carried by the air entering the first tank, a first outlet from the first tank adjacent the upper end thereof, a second inlet opening tangentially into the side of the second tank, passage means connecting the first outlet to the second inlet, a float valve in the path of the first outlet for blocking the outlet when the lower portion of the tank fills with liquid, an inverted frusto-conical member supported on a substantially vertical axis within the second tank with a large opening at the upper end and a smaller opening at the lower end of the inverted frusto-conical member, the large opening being positioned below the inlet opening, the tank including a dirt collector below the inverted frusto-conical member, means defining a generally horizontal annular channel within the second tank, the annular channel having an open lower end above the inverted frusto-conical member and having a central passage through it communicating with the open lower end, the second inlet opening into the side of the annular channel whereby the annular channel swirls the air above the inverted frusto-conical member as dirt and foreign matter fall from the swirling air, a second outlet from the second tank adjacent the upper end thereof and communicating with the central passage through the annular channel, a third inlet to the third tank, passage means connecting the second outlet to the third inlet, a micron separator and vacuum pump means in the third tank, passage means in the third tank to cause air entering the third inlet to flow through the micron separator for separation of the remaining fine dirt particles from the air and thence through the vacuum pump means, the vacuum pump means comprising two separate vacuum pumps, first passage means leading from the micron separator to the inlet to one of the vacuum pumps, constantly open second passage means leading from the outlet of the said one vacuum pump to the inlet to the other vacuum pump, third passage means leading from the micron separator to the inlet of the said other vacuum pump and bypassing the said one vacuum pump, a plate slidable across the third passage means to selectively alternately block and unblock the third passage means while the second passage means remains open, and a manually engageable knob accessible externally of the third tank for sliding the plate.

2. The vacuum cleaning system of claim 1 wherein the base is supported on wheels, a post extending upwardly from the base, bracket means for at least partially supporting the tanks from the post, a frame extending upwardly from the base adjacent one side thereof, and a rotatable drum supported by the frame for receiving a flexible hose of the kind adapted to be connected to the first inlet.

References Cited by the Examiner

UNITED STATES PATENTS

| | | | |
|---|---|---|---|
| 1,559,804 | 11/1925 | Sweeny | 55—356 X |
| 1,763,397 | 6/1930 | Hutchinson | 15—323 X |
| 2,044,830 | 6/1936 | Carlstedt | 230—117 |
| 2,118,167 | 5/1938 | Connor | 55—458 X |
| 2,177,588 | 10/1939 | Genell | 230—177 |
| 2,605,857 | 8/1952 | Smellie | 55—471 X |
| 2,639,005 | 5/1953 | Gerstmann | 55—368 |
| 2,657,416 | 11/1953 | Smith | 55—385 X |
| 2,661,886 | 12/1953 | Speer | 137—417 X |
| 2,690,813 | 10/1954 | Diebold | 55—324 |
| 2,867,231 | 1/1959 | Gerstmann | 15—353 |
| 2,979,159 | 4/1961 | Pritchard et al. | 55—498 |
| 2,997,728 | 8/1961 | Gaudry | 55—385 X |
| 3,006,020 | 10/1961 | Fillery | 55—471 X |
| 3,029,463 | 4/1962 | Bishop | 15—327 |
| 3,032,955 | 5/1962 | Burch | 55—482 X |
| 3,240,000 | 3/1966 | Hayes et al. | 55—337 |

FOREIGN PATENTS

| | | |
|---|---|---|
| 158,211 | 8/1954 | Australia. |
| 506,788 | 9/1930 | Germany. |
| 958,974 | 2/1957 | Germany. |
| 581,228 | 10/1946 | Great Britain. |
| 934,293 | 8/1963 | Great Britain. |
| 131,094 | 3/1951 | Sweden. |

FRANK W. LUTTER, *Primary Examiner.*

HARRY B. THORNTON, D. TALBERT,
*Assistant Examiners.*